Jan. 1, 1946.  H. C. REIMANN ET AL  2,392,063
TRAILER COUPLING
Filed Nov. 18, 1944  2 Sheets-Sheet 1
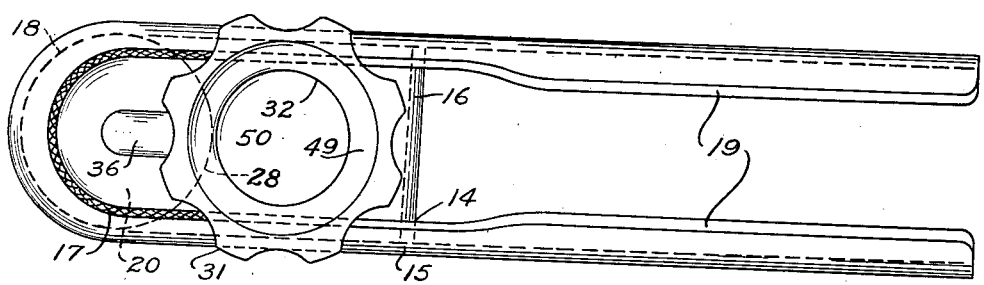
FIG. 1.
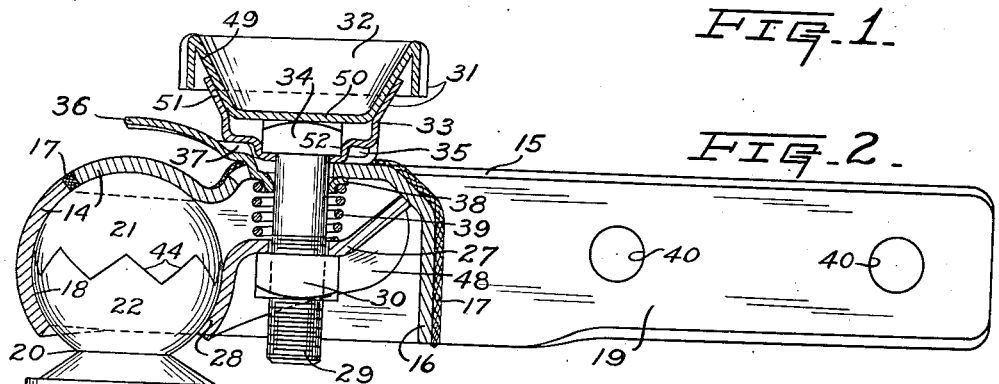
FIG. 2.
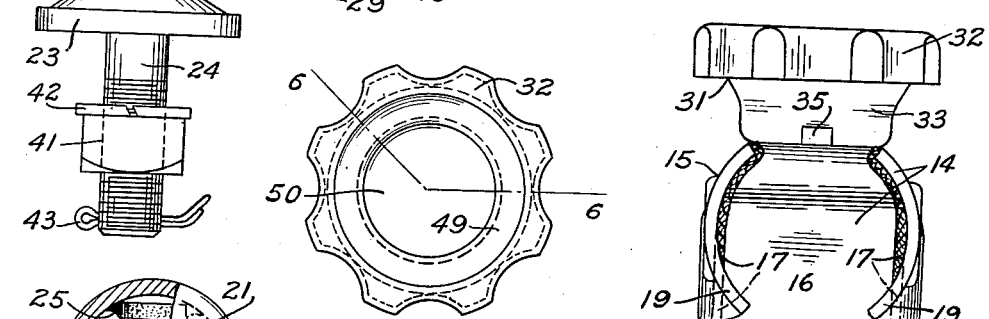
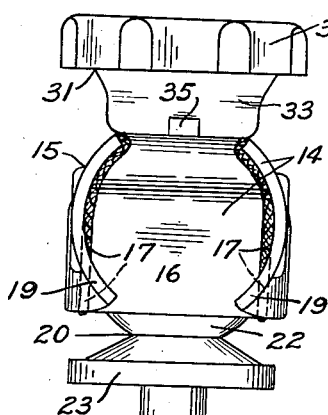
FIG. 3.
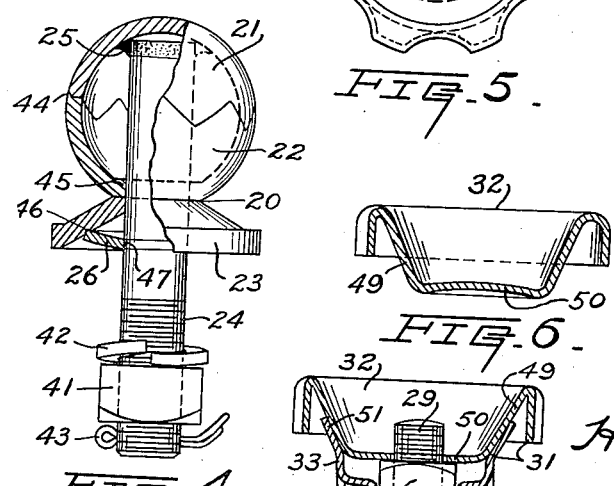
FIG. 5.
FIG. 6.
FIG. 4.
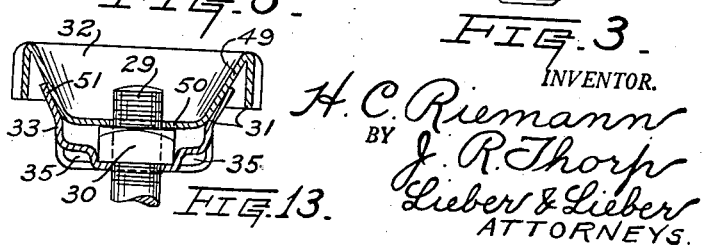
FIG. 13.
INVENTOR.
H. C. Riemann
BY J. R. Thorp
Lieber & Lieber
ATTORNEYS.

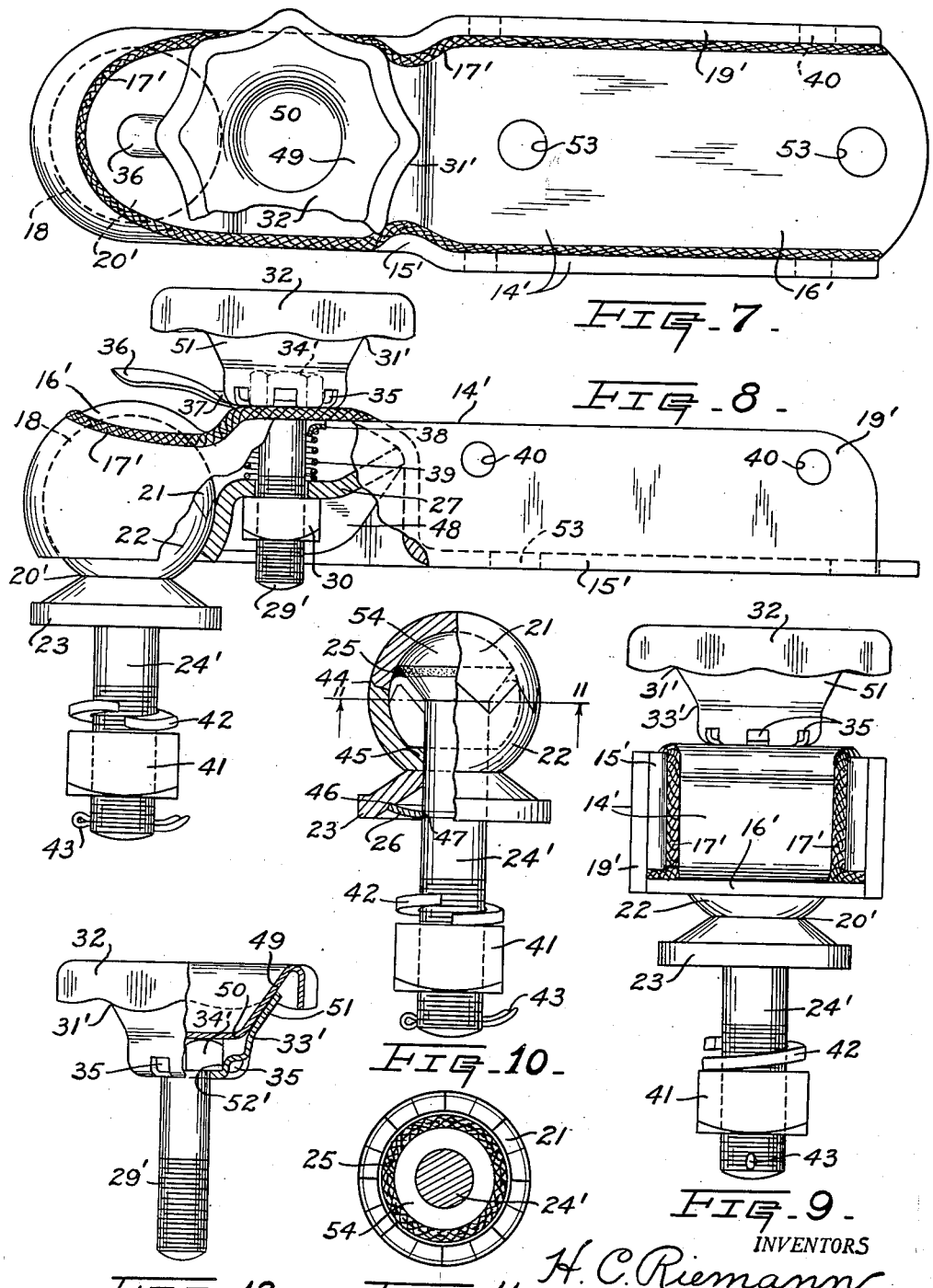

Patented Jan. 1, 1946

2,392,063

UNITED STATES PATENT OFFICE 2,392,063

TRAILER COUPLING

Howard C. Riemann, West Milwaukee, and Joel R. Thorp, West Allis, Wis., assignors to The Fulton Company, West Allis, Wis., a corporation of Wisconsin Application November 18, 1944, Serial No. 564,036

7 Claims. (Cl. 280—33.17)

The present invention relates in general to improvements in the art of manufacturing couplings for connecting trailers to propelling vehicles or the like, and relates more particularly to improvements in the construction and operation of trailer couplings formed primarily of sheet metal.

The principal object of our invention is to provide an improved trailer coupling which may be manufactured at moderate cost from sheet metal or the like with the aid of punches and dies, and which is of sturdy construction and efficient in operation.

Many different types of so-called trailer couplings for detachably connecting trailing vehicles to tractors, trucks and pleasure cars, have heretofore been proposed and used extensively, with varying degrees of success; and in most cases these prior devices were constructed of cast metal parts except for standard springs and fasteners used in their assemblages. Perhaps one of the most successful of these prior trailer couplings is the type shown in U. S. Patent No. 2,250,661, granted July 29, 1941, which comprises in general a coupling member or body having a spherical front socket and a rear shank formed for attachment to a trailing vehicle, a spherical member or ball element cooperable with the body socket and being attachable to the pulling vehicle, a retainer plate coacting with the coupling body and having a spherical zone surface cooperable with the ball to normally retain the same within the socket, an adjusting bolt penetrating the plate and the body and having an adjusting hand wheel secured to its upper headed end, a latch having a hub surrounding the bolt and provided with a locking portion engageable with teeth or notches on the hand wheel to prevent loosening of the bolt, and a spring embracing the bolt and coacting with the latch hub to constantly urge the latch into locking position. The previous couplings of this particular type, were formed primarily of metal castings which could be produced only at considerable cost by slow foundry methods, and which frequently contained hidden defects making them dangerous and unreliable in use; and while some attempts were heretofore made to produce the main coupling body, ball and retainer plate of sheet metal, these proved rather costly and relatively unsatisfactory.

It is therefore a more specific object of our present invention to provide an improved mode of rapidly and effectively producing the various major parts of trailer couplings of the above described specific type, from durable sheet metal and at moderate cost.

Another object of this invention is to provide a strong coupling member or body having spherical socket and attaching portions at its opposite ends, and which is formed of only a few sheet metal parts rigidly united by fusion of metal or welding.

A further object of the invention is to provide a durable spherical member or ball element for couplings, which may also be formed of a limited number of simple parts firmly united by welding and pressing to produce a most efficient and accurate sphere element without necessitating costly finishing.

An additional object of our invention is to provide an improved sheet metal adjusting, assembling, and dismantling hand wheel assemblage for trailer couplings, which may be readily constructed of two simple stampings effectively united by spot welding so as to simultaneously attach the wheel to its associated adjusting bolt or screw.

Still another object of this invention is to provide a simplified retainer plate for normally keeping the coupling parts united, and which may also be made of a single sheet metal stamping with the aid of punches and dies.

These and other specific objects and advantages of our invention will be apparent from the following detailed description.

A clear conception of the several features constituting our present improvement, and of the mode of constructing and of utilizing several sizes of trailer couplings embodying these features, may be had by referring to the drawings accompanying and forming a part of this specification wherein like reference characters designate the same or similar parts in the various views.

Fig. 1 is a top view of one of the improved sheet metal trailer couplings of relatively small size and limited pulling capacity adapted for comparatively light service;

Fig. 2 is a central longitudinal section through the coupling assemblage of Fig. 1 but showing the ball member in elevation;

Fig. 3 is a rear end view of the trailer coupling of Figs. 1 and 2;

Fig. 4 is a part sectional side elevation of the ball member used in the smaller size trailer couplings of Figs. 1 to 3 inclusive;

Fig. 5 is a top view of the upper sheet metal section of one of the improved adjusting hand wheels, showing the formation thereof;

Fig. 6 is a section through the upper hand wheel portion, taken along the line 6—6 of Fig. 5;

Fig. 7 is a top view of another of our improved sheet metal trailer couplings of larger size and pulling capacity especially adapted for heavier duty;

Fig. 8 is a part sectional side elevation of the heavy duty coupling of Fig. 7;

Fig. 9 is a rear end view of the trailer coupling of Figs. 7 and 8;

Fig. 10 is a part sectional side elevation of the ball member preferably employed in the heavier duty couplings;

Fig. 11 is a transverse section through the ball member of Fig. 10, taken along the line 11—11;

Fig. 12 is a part sectional side elevation of the adjusting hand wheel and bolt used on the larger size couplings; and Fig. 13 is a view similar to Fig. 12 but showing a modified hand wheel structure.

While the invention has been shown and described herein as having been embodied in only two specific sizes of sheet metal trailer couplings of a special type especially adapted for use on automobiles and trailers therefor, it is not our desire or intent to thereby unnecessarily restrict the scope or utility of the improved features.

Referring particularly to Figs. 1, 2 and 3 of the drawings, the improved light duty sheet metal trailer coupling shown therein comprises in general a frame or body member 14 formed of a U-shaped sheet metal strap section 15 and a cooperating sheet metal top section 16 united by a continuous weld 17, and coacting to provide a spherical socket 18 at the front and parallel attaching portions 19 at the rear of the member 14; a spherical or ball member 20 normally coacting with the socket 18 and being formed of superimposed sheet metal top, intermediate and bottom sheet metal sections 21, 22, 23 respectively all firmly secured to an attaching stud 24 by means of an annular weld 25 and a clamping disc 26; a sheet metal retainer plate 27 confined within and coacting with the body top section 16 and having a spherical zone portion 28 normally coacting with the socket 18 to maintain the ball therein; an assembly bolt 29 piercing the top section 16 and plate 27 and carrying an adjustable nut 30 coacting with the latter; a bolt manipulating hand wheel 31 formed of two firmly united upper and lower sheet metal sections 32, 33 clampingly coacting with the square head 34 of the bolt 29 and provided with an annular series of teeth or notches 35 in the lower section 33; a sheet metal latch 36 extending through an opening in the body section 16 and having a locking projection 37 engageable with the notches 35 of the hand wheel and also being provided with a hub 38 surrounding the bolt 29 beneath the body section 16; and a helical compression spring 39 interposed between the plate 27 and the latch hub 38.

The strap section 15 of the frame or body member 14, is formed of a single piece of sheet metal bent into U-shape with the aid of punches and dies; and the front portion of the section 15 is pressed into shape so as to provide a truly spherical socket 18, while the rear portions 19 are curved to fit a cylindrical draft rod or pole and are provided with alined holes 40 for the reception of fastening bolts or pins, see Figs. 1, 2 and 3. The top section 16 of the frame or body member 14, is likewise formed of a single piece of sheet metal bent into the shape shown in Fig. 2, with the aid of punches and dies, and the front upper portion of this section 16 provides a true continuation of the spherical socket 18, while the rear portion extends downwardly and provides an inclined seat for the rear end of the retainer plate 27. The two sections 15, 16 are rigidly united by the weld 17 which extends along the entire joint or surfaces of coaction of these sections, thereby providing a durable frame structure in which the pull is transmitted primarily through the one-piece U-shaped section 15 which is prevented from spreading by the top section 16.

The spherical ball member 20 which is attachable to the pulling or draft vehicle by means of the stud bolt 24 forming a rigid part thereof, is likewise formed primarily of sheet metal with the aid of punches and dies, and the stud bolt 24 may be provided with a nut 41 and lock washer 42 for facilitating attachment thereof to its carrying vehicle, and with a cotter pin 43 for preventing loss of the nut and washer. The sheet metal top section 21 of the spherical member 20 is rigidly attached to the top of the stud bolt 24 by means of a heavy annular weld 25, and has a lower serrated edge the serrations of which are snugly cooperable with similar serrations formed at the upper edge of the intermediate ball section 22. The serrations of the intermediate section 22 have a continuous ridge 44 formed thereon as shown in Fig. 4, which overlaps the edges of the serrations formed on the top section 21; and the lower end of the section 22 is provided with an integral inner flange 45 bored to fit the bolt 24. The base section 23 is also bored to fit the bolt 24 and is likewise stamped from ordinary sheet metal. The clamping disc 26 is originally of frustro-conical shape and is surface hardened after forming thereof.

When assembling the ball members 20, the sections 21, 22, 23 are first loosely assembled and placed into a snug fitting form, whereupon the discs 26 are applied to the bolts 24 and base sections 23, and are subsequently distorted and pressed firmly in place so as to cause the outer and inner disc peripheries to bite into the adjacent sections 23 and bolts 24, thus firmly and permanently uniting all of the sections 21, 22, 23 with the stud bolt 24. The distorted discs 26 assume the approximate shape shown in Fig. 4, and form grooves 46, 47 in the sections 23 and bolts 24 respectively; and the spheres formed by the cooperating sections 21, 22 of the members 20, are adapted to snugly fit the body member sockets 18.

As previously indicated, the retainer plate 27 of the improved coupling, is also formed of a single piece of sheet metal with the aid of punches and dies, and this plate 27 besides being provided with a spherical zone portion 28 cooperating with the adjacent ball member 20, is reenforced by opposite side flanges 48 which normally coact with the adjacent nut 30 so as to prevent the latter from turning. The adjusting bolt 29 and the retaining nut 30 coacting therewith, may be of standard construction, and as shown in Figs. 1 and 2, the bolt 29 has a square head 34, although hexagonal headed bolts may also be employed.

The bolt 29 may normally be manipulated with the aid of an improved sheet metal hand wheel 31, the two sections 32, 33 of which are metal stampings firmly united by spot welding or otherwise. The upper section 32 of the hand wheel 31 is formed substantially as shown in detail in Figs. 5 and 6, with a frustro-conical depending central portion 49 having a slightly crowned bottom 50; and the lower section 33 has a cup-shaped upwardly diverging flange 51 which is adapted to snugly fit the conical portion 49 and is welded thereto when the bolt head 34 has been interposed between the sections 32, 33 and the crowned bottom 50 of the former has been pressed against the head 34. The notches 35 of the lower hand wheel section 33 are formed by indenting the metal near the bottom of this section, sufficiently to form a square socket 52 adapted to snugly engage the four flat sides of the bolt head 34, thus providing a sheet metal hand wheel which cannot turn relative to the attached bolt 29.

If so desired, the hand wheel 31 and bolt 29 may be assembled as in Fig. 13 wherein the nut 30 is confined within the sheet metal wheel and the bolt 29 pierces the hand wheel and coacts with the threads of the nut 30.

The latch 36 with its integral hub 38 and locking projection 37, is again formed of a single sheet metal stamping; while the helical compression spring 39 which constantly urges the latch 36 upwardly and the retainer plate 27 downwardly against the nut 30, may be of conventional construction and should be stiff enough to prevent rattling. The latch 36 which extends through the top section 16 of the body member 14 is thus prevented from turning about the axis of the bolt 29, but may be pressed downwardly at will so as to release the locking projection 37 from the notches 35 and to thereby permit free turning of the hand wheel 31 and bolt 29 for adjustment purposes.

Referring more particularly to Figs. 7 to 12 inclusive of the drawings, the heavy duty sheet metal trailer coupling shown therein, is quite similar to that shown in Figs. 1 to 6 inclusive, except for modifications in the details of construction of various parts. In the heavy duty coupling, the main frame or body 14' is formed of two sections 15', 16' the former of which is constructed as a U-shaped strap, and the latter of which is interfitted within the U-shaped section 15' and is rigidly connected thereto by a continuous sturdy weld 17'. The parallel rear portions 19' of the body section 15' are provided with fastening openings 40, and the rear flat part of the intervening section 16' may also be provided with bolt holes 53 as shown in Fig. 7. The ball member 20' is constructed in a manner similar to that of the member 20, except that a headed bolt 24' is provided instead of a stud bolt 24. This modified bolt 24' is shown in Figs. 10 and 11, and has a head 54 which is firmly united with the sheet metal top section 21 by a continuous annular weld 25. The assembly and retaining bolt 29' of the heavy duty coupling is provided with a hexagonal head 34' as indicated in Figs. 8 and 12, and the lower section 33' of the hand wheel 31' is provided with a correspondingly hexagonal socket 52' coacting with the bolt head 34'. Except for increases in thickness of stock and necessary variations in dimensions, the heavy duty coupling is the same as the lighter coupling of Figs. 1 to 6 inclusive, and both types of couplings may be constructed, assembled, or dismantled in like manner, and also function the same when properly assembled and applied to vehicles.

Since the mode of construction and assembling the two types of couplings, and the method of utilizing the same, is substantially alike, it will suffice to describe the normal use of only the light weight type of coupling shown in Figs. 1 to 3 inclusive.

When the coupling has been properly constructed and assembled, it may be readily applied to a trailer and to a pulling vehicle with the aid of bolts inserted within the openings 40 of the body member 14, and by applying the bolt 24 of the ball member 20 to a propelling vehicle in an obvious manner. The hand wheel 31 may then be manipulated to cause the bolt 29 to rotate within the nut 30 which is held within the retainer plate 27, so as to cause this plate to lower sufficiently under the influence of the spring 29, to permit free insertion of the ball within the socket 18. After the ball has been thus inserted within the socket, the hand wheel 31 may be reversely manipulated so as to cause the retainer plate 27 to move into operative position, thereby compressing the spring 29 and causing the latch 26 to be urged upwardly toward the hand wheel. When the plate 27 has been elevated sufficiently so as to retain the ball within the socket but to permit relatively free universal movement between the members 14, 20, the hand wheel 31 may be turned slightly so as to permit the locking projection 37 to enter the nearest notch 35, whereupon the parts will be locked in adjusted position and the coupling is ready for normal use. During normal operation of the coupling, the ball member 20 may oscillate within the socket 18 of the body member 14, so that the vehicles may be operated over uneven ground. When it becomes desirable to detach the trailer from the pulling vehicle, it is only necessary to release the latch 36 and to thereafter manipulate the hand wheel 31 so as to lower the retainer plate 27 sufficiently to permit withdrawal of the ball from within the socket. If the play between the ball and socket is too great, the hand wheel 31 may obviously be turned a fraction of a revolution so as to eliminate such excessive play. It will thus be noted that the improved trailer coupling which is made primarily of sheet metal with the aid of punches and dies, will function to provide a universal connection between the propelling and trailing vehicles, and will also permit ready attachment and detachment of the two vehicles.

From the foregoing detailed description it will be apparent that our present invention provides an improved trailer coupling which is extremely simple, compact, and durable in construction, and which may be readily constructed at moderate cost with the aid of punches and dies. The improved body member 14, 14' may be sturdily constructed of two parts which may be firmly welded together to provide an extremely strong pull transmitting element. The member 14, 14' may be readily attached to a trailing vehicle, and either attached to or detached from the pulling vehicle; and the improved ball member 20, 20' may be sturdily and accurately constructed from sheet metal and firmly attached to the supporting bolt 24, 24'. The improved sheet metal hand wheels 31, 31' may also be readily constructed of two pieces of sheet metal, so as to fit either square head or hexagonal headed bolts, and are firmly applied to their carrying bolts by virtue of the improved construction of the lower sections thereof. The retainer plate 27 and the latch 36 are also readily constructable from sheet metal with the aid of punches and dies, and the entire assemblage is exceedingly strong and rigid and can stand considerable shock without becoming inoperative. The invention has proven highly satisfactory in actual use, and the improved couplings while being stronger than the prior cast metal couplings of the same type, may be produced at comparatively low cost as compared to the cost of the prior couplings. With the aid of the present invention, the trailer couplings can obviously be produced of relatively light but strong sheet steel, with the aid of punches and dies, and at considerably less cost but with greater strength than was possible in the cast metal prior couplings.

It should be understood that it is not desired to limit this invention to the exact details of construction or to the precise mode of use, herein shown and described, for various modifications within the scope of the appended claims may occur to persons skilled in the art.

We claim:

1. In a tow coupling, a body member, a ball member cooperable with said body member, and a retainer plate for detachably connecting said members, said body member comprising a U-shaped strap section providing a seating socket for said ball member, and an intervening section having a spherical zone top welded to the upper part of the socketed portion of said strap section to complete the socket and also having an integral rear wall providing a reaction abutment for said retainer plate.

2. In a tow coupling, a body member, a sheet metal ball member cooperable with said body member, and a sheet metal retainer plate for detachably connecting said members, said body member comprising a U-shaped sheet metal strap section providing a seating socket for said ball member, and an intervening sheet metal section having a spherical zone top welded to the upper part of the socketed portion of said strap section to complete the socket and also having an integral rear wall providing a reaction abutment for said retainer plate.

3. In a tow coupling, a body member, a ball member cooperable with said body member, and a retainer plate for detachably connecting said members, said body member comprising a U-shaped strap section providing a seating socket for said ball member and having parallel spaced side portions extending rearwardly away from said socket, and an intervening section having a spherical zone top welded to the upper part of the socketed portion of said strap section to complete the socket and also having an integral rear wall welded to said side strap portions and providing a reaction abutment for said retainer plate.

4. In a tow coupling, a body member, a sheet metal ball member cooperable with said body member, and a sheet metal retainer plate for detachably connecting said members, said body member comprising a U-shaped sheet metal strap section providing a seating socket for said ball member and having integral parallel spaced side portions extending rearwardly away from the socket, and an intervening sheet metal section having a spherical zone top welded to the upper part of the socketed portion of said strap section to complete the socket and also having an integral rear wall welded to said side strap portions and providing a reaction abutment for said retainer plate.

5. In a tow coupling, a body member comprising a U-shaped strap having a seating socket and integral parallel spaced side portions extending rearwardly away from the socket and an intervening section welded to the top of the socket and provided with an integral wall extending downwardly between and welded to said side portions remote from said socket, a ball member coacting with said socket, and a retainer plate confined within said body and having a front portion coacting with said ball member and a rear end reacting against said wall.

6. In a tow coupling, a sheet metal body member comprising a U-shaped sheet metal strap having a seating socket and integral parallel spaced side portions extending rearwardly away from the socket and an intervening sheet metal section welded to the top of the socket and provided with an integral wall extending downwardly between and welded to said side portions remote from said socket, a sheet metal ball member coacting with said socket, and a sheet metal retainer plate confined within said body and having a front portion coacting with said ball member and a rear end reacting against said wall.

7. In a tow coupling having coacting ball and socket members, said ball member comprising a central attaching bolt, a sheet metal spherical zone section firmly welded to an end of said bolt, another sheet metal spherical zone section coacting with said first mentioned section to complete the ball, a sheet metal base section having a bore snugly fitting said bolt and also coacting with said second spherical zone section, and a hard frustro-conical clamping disc forced into biting coaction with said base and second sections to clamp all of said sections together, the engaging ends of said spherical zone sections being serrated to provide a serrated joint extending medially around the ball.

HOWARD C. RIEMANN.
JOEL R. THORP.